UNITED STATES PATENT OFFICE.

OSCAR ALTPETER, OF MILWAUKEE, WISCONSIN.

PLASTIC COMPOSITION.

1,206,076.  Specification of Letters Patent.  Patented Nov. 28, 1916.

No Drawing.  Application filed January 8, 1915. Serial No. 1,155.

*To all whom it may concern:*

Be it known that I, OSCAR ALTPETER, a citizen of the United States, residing at Milwaukee, in the county of Milwaukee and State of Wisconsin, have invented a certain new and useful Improvement in Plastic Compositions, of which the following is a full, clear, concise, and exact description.

My invention relates to a new composition of matter of use more particularly in connection with roofing.

Although the use of my improved composition is not to be so limited, I will herein however describe its advantageous features in connection with roofing and its manner of manufacture.

My improved composition in one form of carrying out my invention is used in the form of sheets which may have the size of ordinary shingles and which sheets can thus be used to construct a roof similarly as when wooden shingles are used.

The advantages of my improved composition of matter are its fire proof qualities. As is well understood wooden shingles present a greater fire hazard than any other one single item of construction, and to obviate this requires the use of some fireproof material which is cheap and shall stand the ravages of the elements, which lends itself readily to production in sheets; which is not of great weight, and which can readily be attached in position. My improved composition of matter has all of these qualifications.

My improved composition of matter herein comprises a fibrous variety of amphibole as a base. Amphibole is a mineral substance found generously in this country and includes different grades of asbestos of a sufficiently fibrous nature to meet the requirements for a composition of matter such as called for herein.

One specific formula which I have found especially desirable in practice is the following:

| | |
|---|---|
| Amphibole asbestos | 58% |
| Rock asphalt | 20% |
| Gum asphalt | 10% |
| Refined tar pitch | 10% |
| Ammonium or aluminum sulfate | 2% |
| | 100% |

The proportions given are by weight. I find that I may even leave out the refined tar pitch, the rock asphalt and the ammonium or aluminum sulfate and still have a composition meeting the requirements outlined in the earlier part of this specification. It will be noticed that the asbestos constitutes the major portion of the mixture, and this is of especial importance for the purposes of the invention. The ingredients mentioned in the foregoing formula are to be thoroughly mixed in a stem jacketed mixer or kneader at a temperature not exceeding 140° C., for approximately one-half an hour. After this the mixture is dumped into a hopper from which it may be readily fed into machinery to be rolled into strips and cut to the desired size for use.

From the foregoing the nature of my invention will be clear, as will also its various uses.

Having however thus described one form which my invention may take, what I claim as new and desire to secure by Letters Patent is:

As a new article of manufacture, a composition of matter for roofing and the like comprising the follownig ingredients in approximately the gravimetric proportions specified: asbestos, 58 parts; rock asphalt, 20 parts; gum asphalt, 10 parts; refined tar pitch, 10 parts.

In witness whereof, I hereunto subscribe my name this 18th day of August, A. D., 1914.

OSCAR ALTPETER.

Witnesses:
MAX W. ZABEL,
HAZEL ANN JONES.